(12) United States Patent
Rackl

(10) Patent No.: US 12,522,085 B2
(45) Date of Patent: Jan. 13, 2026

(54) METHOD AND DEVICE FOR STARTING A VEHICLE ELECTRICAL WIRING SYSTEM

(71) Applicant: Bayerische Motoren Werke Aktiengesellschaft, Munich (DE)

(72) Inventor: Stefan Rackl, Parsdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 155 days.

(21) Appl. No.: 18/610,139

(22) Filed: Mar. 19, 2024

(65) Prior Publication Data

US 2024/0317075 A1  Sep. 26, 2024

(30) Foreign Application Priority Data

Mar. 20, 2023 (DE) ............... 10 2023 106 923.3

(51) Int. Cl.
*G06F 17/00* (2019.01)
*B60L 50/60* (2019.01)

(52) U.S. Cl.
CPC ........... *B60L 50/60* (2019.02); *B60L 2210/10* (2013.01); *B60L 2240/427* (2013.01)

(58) Field of Classification Search
CPC ........... B60L 50/60; B60L 2210/10; B60L 2240/427; B60L 2200/12; B60L 2200/18; B60L 2200/36; B60L 2210/12; B60L 58/10; B60L 1/00; B60L 3/00; B60L 58/18; B60R 16/033
USPC .......................................................... 701/22
See application file for complete search history.

(56) References Cited

U.S. PATENT DOCUMENTS

| 7,733,038 B2* | 6/2010 | Franke | B60L 58/20 363/16 |
| 9,768,606 B2* | 9/2017 | Kuehner | B60L 3/0053 |
| 2024/0317075 A1* | 9/2024 | Rackl | B60R 16/033 |

FOREIGN PATENT DOCUMENTS

| CN | 118665261 A * | 9/2024 | ............... B60L 1/00 |
| DE | 10 2019 134 213 A1 | 6/2021 | |
| DE | 102022000832 A1 * | 4/2022 | ............... B60L 1/00 |
| DE | 102020007306 A1 * | 6/2022 | ............. B60L 58/20 |

(Continued)

OTHER PUBLICATIONS

A comprehensive overview of the dc-dc converter-based battery charge balancing methods in electric vehicles (Year: 2020).*

(Continued)

*Primary Examiner* — Ronnie M Mancho
(74) *Attorney, Agent, or Firm* — Crowell & Moring LLP

(57) ABSTRACT

A device for controlling a starting process of a vehicle electrical wiring system of a vehicle. The vehicle wiring system has a first energy store and a second energy store that are connectable in series as a result of a series switching element closing. The vehicle wiring system has a first DC-DC voltage converter with: a first pole that is coupled to a coupling point between a first pole of the first energy store and the series switching element, and a second pole that is coupled to a second pole of the first energy store via a second converter switching element. The device ascertains, before the series switching element closes, voltage information relating to a voltage across the series switching element. The device takes the voltage information as a basis for operating the first DC-DC voltage converter to cause the voltage across the series switching element to be reduced before the series switching element closes.

11 Claims, 3 Drawing Sheets

(56) References Cited

FOREIGN PATENT DOCUMENTS

| | | | | |
|---|---|---|---|---|
| DE | 102023106923 B3 * | 7/2024 | ................ | B60L 1/00 |
| WO | WO-2014056663 A1 * | 4/2014 | .............. | H02J 1/082 |

OTHER PUBLICATIONS

German-language Search Report issued in German Application No. 10 2023 106 923.3 dated Sep. 18, 2023, with partial English translation (15 pages).

* cited by examiner

METHOD AND DEVICE FOR STARTING A VEHICLE ELECTRICAL WIRING SYSTEM

CROSS REFERENCE TO RELATED APPLICATION

This application claims priority under 35 U.S.C. § 119 from German Patent Application No. 10 2023 106 923.3, filed Mar. 20, 2023, the entire disclosure of which is herein expressly incorporated by reference.

BACKGROUND AND SUMMARY

The invention relates to a method and a corresponding device for starting the vehicle electrical wiring system of a motor vehicle.

An electrically driven vehicle has a vehicle electrical wiring system having one or more electrical energy stores for supplying energy to an electric drive machine of the vehicle. At the beginning of a journey by the vehicle, a starting process of the vehicle electrical wiring system is typically carried out that involves the different components of the vehicle wiring system, in particular the electrical drive machine, being coupled to the one or more electrical energy stores.

The present document is concerned with the technical problem of achieving a particularly reliable, gentle and safe starting process for the vehicle electrical wiring system of a vehicle.

The problem is solved by each of the independent claims. Advantageous embodiments are described in the dependent claims, inter alia. It is pointed out that additional features of a patent claim dependent on an independent patent claim, without the features of the independent patent claim or only in combination with a subset of the features of the independent patent claim, can form a separate invention, independent of the combination of all of the features of the independent patent claim, that can be turned into the subject matter of an independent claim, a divisional application or a subsequent application. This applies in the same way to technical teachings described in the description that are able to form an invention independent of the features of the independent patent claims.

According to one aspect, a device for controlling a starting process of a vehicle electrical wiring system of a (motor) vehicle is described. The vehicle wiring system may be designed to provide electrical energy for operating an electrical drive machine of the vehicle. The vehicle electrical wiring system may be designed for a vehicle wiring system voltage of 300 V or more, in particular of 600 V or more, for example of 800 V.

The vehicle electrical wiring system comprises a first energy store (having a first rated voltage, e.g. of 300 V or more, for example 400 V) and a second energy store (having a second rated voltage, e.g. of 300 V or more, for example 400 V) that are able to be connected in series as a result of a series switching element closing. The series switching element may comprise a mechanical relay and/or a semiconductor-based switching element (for example an IGBT). Closing the series switching element allows a series connection containing the first and the second energy store to be produced, the series connection having an RMS rated voltage that is equal to or greater than the sum of the first and the second rated voltage. During the starting process, the series connection can be arranged in parallel with an inverter for operating the electrical drive machine (the inverter typically having a DC link capacitor at its input).

The first energy store and the second energy store may each comprise, in particular be, electrochemical energy stores, e.g. may each comprise, in particular be, a lithium-ion-based battery.

The vehicle wiring system furthermore comprises a first DC-DC voltage converter, having a first pole that is coupled, or can be coupled, to a coupling point between a first pole (e.g. the negative pole) of the first energy store and the series switching element (in some cases via a first converter switching element), and having a second pole that is coupled, or can be coupled, to a second pole (e.g. the positive pole) of the first energy store (in some cases via a second converter switching element).

The first DC-DC voltage converter can in some cases be arranged in parallel with the first energy store as a result of the first converter switching element and the second converter switching element closing, in particular in order to provide electrical energy from the first energy store at the input, in particular on an input capacitance, of the first DC-DC voltage converter. The first DC-DC voltage converter may be designed to transfer electrical energy from the input of the first DC-DC voltage converter to a further vehicle wiring system (e.g. to a low-voltage vehicle wiring system having a vehicle wiring system voltage of 60 V or less, for example 12 V or 48 V).

The converter switching elements may each comprise, in particular be, a mechanical relay and/or a semiconductor-based switching element, for example an IGBT.

The vehicle electrical wiring system may furthermore comprise a second DC-DC voltage converter, which is arranged relative to the second energy store in corresponding fashion. The second DC-DC voltage converter may have a first pole that is coupled, or can be coupled, to a further coupling point between a first pole (e.g. the positive pole) of the second energy store and the series switching element (via a further first converter switching element). The second DC-DC voltage converter may furthermore have a second pole that is coupled, or can be coupled, to a second pole (e.g. the negative pole) of the second energy store (in some cases via a further second converter switching element).

The second DC-DC voltage converter can in some cases be arranged in parallel with the second energy store as a result of the further first converter switching element and the further second converter switching element closing, in particular in order to provide electrical energy from the second energy store at the input, in particular on an input capacitance, of the second DC-DC voltage converter. The second DC-DC voltage converter may be designed to transfer electrical energy from the input of the second DC-DC voltage converter to a further (or to the aforementioned further) vehicle wiring system (e.g. to a low-voltage vehicle wiring system having a vehicle wiring system voltage of 60 V or less, for example 12 V or 48 V).

The vehicle electrical wiring system may furthermore comprise a DC link capacitance, which is arranged (directly) between the second pole (e.g. the positive pole) of the first DC-DC voltage converter and the second pole (e.g. the negative pole) of the second DC-DC voltage converter. The DC link capacitance may be arranged at the input of the inverter. The DC link capacitance may furthermore be arranged such that the DC link capacitance can be decoupled from the second pole (e.g. the positive pole) of the first energy store and from the second pole (e.g. the negative pole) of the second energy store as a result of the second converter switching elements opening and can be arranged between the second pole of the first energy store and the second pole of the second energy store as a result of the second converter switching elements closing.

The vehicle wiring system may furthermore have one or more measuring resistors, which are designed such that, even if the vehicle wiring system is in a basic state (with the series switching element open and with the converter switching elements open), electrical energy can pass from the first and/or the second energy store to the input capacitance of the first and/or the second DC-DC voltage converter (and can lead to the respective input capacitance being charged).

In addition, the vehicle wiring system may have one or more insulating resistors (with respect to the ground and/or the bodywork of the vehicle). Illustrative insulating resistors are:

an insulating resistor between the second pole of the first DC-DC voltage converter and ground;
an insulating resistor between the first pole of the first DC-DC voltage converter and ground;
an insulating resistor between the second pole of the second DC-DC voltage converter and ground;
an insulating resistor between the first pole of the second DC-DC voltage converter and ground;
an insulating resistor between the second pole of the first energy store and ground;
an insulating resistor between the first pole of the first energy store and ground;
an insulating resistor between the second pole of the second energy store and ground;
an insulating resistor between the first pole of the second energy store and ground;
an insulating resistor between the second pole of the DC link capacitance and ground; and/or
an insulating resistor between the first pole of the DC link capacitance and ground.

At the beginning of the starting process, the vehicle wiring system may be in the basic state. The switching elements of the vehicle wiring system can then be gradually closed in order to arrange the series connection containing the first and second energy stores in parallel with the DC link capacitance.

The device is configured to (during the starting process) ascertain, before the series switching element closes, voltage information relating to the voltage across the series switching element. In this context, the device may be configured to ascertain a measured value for the input voltage across the input capacitance of the first DC-DC voltage converter. Alternatively, or additionally, a measured value for the input voltage across the input capacitance of the second DC-DC voltage converter can be ascertained. The voltage information relating to the voltage across the series switching element can then be ascertained precisely on the basis of the measured value of the input voltage across the input capacitance of the first DC-DC voltage converter and/or on the basis of the measured value of the input voltage across the input capacitance of the second DC-DC voltage converter.

In addition, the device is configured to take the voltage information as a basis for operating the first and/or the second DC-DC voltage converter in order to cause the voltage across the series switching element to be reduced before the series switching element closes, in particular to cause the voltage across the series switching element to be reduced to a value that is equal to or less than a (predefined) voltage threshold value before the series switching element closes.

The device may in particular be configured to take the voltage information as a basis for checking whether the voltage across the series switching element is greater than or less than the voltage threshold value. The first and/or the second DC-DC voltage converter can be operated to reduce the voltage when (and in some cases only when) the voltage across the series switching element is greater than the voltage threshold value.

The first and/or the second DC-DC voltage converter can be operated (and voltage information can be repeatedly ascertained in the process) until it is determined during the starting process (on the basis of the respective ascertained voltage information) that the voltage across the series switching element is equal to or less than the voltage threshold value. In response to this, a further (second) step of the starting process can involve causing the series switching element to be closed in order to produce the series connection containing the first energy store and the second energy store.

The device may be configured (in order to reduce the voltage across the series switching element) to operate the first and/or the second DC-DC voltage converter in order to transfer electrical energy from the input, in particular from the input capacitance, of the first and/or the second DC-DC voltage converter to the further vehicle wiring system of the vehicle, and/or to dissipate said electrical energy to the ground of the vehicle.

A device is therefore described that is able to achieve a safe and gentle starting process for the vehicle wiring system even when (in some cases aging-related) asymmetries in the insulating resistors have resulted in relatively high input voltages across the input capacitances of the first and/or the second DC-DC voltage converter.

The device may be configured to use a first step of the starting process to cause the first converter switching element and/or the further first converter switching element to be closed in order to couple the first pole of the first DC-DC voltage converter to the coupling point, and/or in order to couple the first pole of the second DC-DC voltage converter to the further coupling point. The voltage information relating to the voltage across the series switching element can be ascertained after the one or more first converter switching elements has/have closed and before the series switching element closes. It is then possible to use a subsequent (second) step to cause the series switching element to close (if the voltage across the series switching element is equal to or less than the voltage threshold value).

The device may furthermore be configured to, during the starting process, subsequently to the series switching element closing, cause the second converter switching element and/or the further second switching element to be closed (in a third step) in order to couple the second pole of the first DC-DC voltage converter to the second pole of the first energy store, and/or in order to couple the second pole of the second DC-DC voltage converter to the second pole of the second energy store. This provides a particularly safe and gentle way of causing the series connection containing the first energy store and the second energy store to be arranged in parallel with the DC link capacitance.

According to a further aspect, a vehicle electrical wiring system for a vehicle is described that comprises the (control) device (for controlling a starting process of the vehicle wiring system) described in this document.

According to a further aspect, a (road) motor vehicle (in particular an automobile or a truck or a bus or a motorcycle) is described that comprises the device described in this document and/or the vehicle wiring system described in this document.

According to a further aspect, a method for controlling a starting process of a vehicle electrical wiring system of a vehicle is described. The vehicle electrical wiring system comprises a first energy store and a second energy store that are able to be connected in series as a result of a series switching element closing. The vehicle wiring system furthermore comprises a first DC-DC voltage converter, having a first pole that is coupled to a coupling point between a first pole of the first energy store and the series switching element, and having a second pole that can be coupled to a second pole of the first energy store via a second converter switching element (that is still open).

The method comprises ascertaining, before the series switching element closes, voltage information relating to a voltage across the series switching element. In addition, the method comprises taking the voltage information as a basis for reducing, as a result of the first DC-DC voltage converter operating, the voltage across the series switching element before the series switching element closes.

According to a further aspect, a software (SW) program is described. The SW program can be configured to be executed on a processor (e.g. on a control unit of a vehicle) and to thereby carry out the method described in this document.

According to a further aspect, a storage medium is described. The storage medium can comprise an SW program that is configured to be executed on a processor and to thereby carry out the method described in this document.

It should be noted that the methods, devices and systems described in this document can be used either on their own or in combination with other methods, devices and systems described in this document. In addition, all aspects of the methods, devices and systems described in this document can be combined with one another in a wide variety of ways. In particular, the features of the claims can be combined with one another in a wide variety of ways. Furthermore, features shown between parentheses should be understood as optional features.

The invention is described in more detail below on the basis of exemplary embodiments. In this case, Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
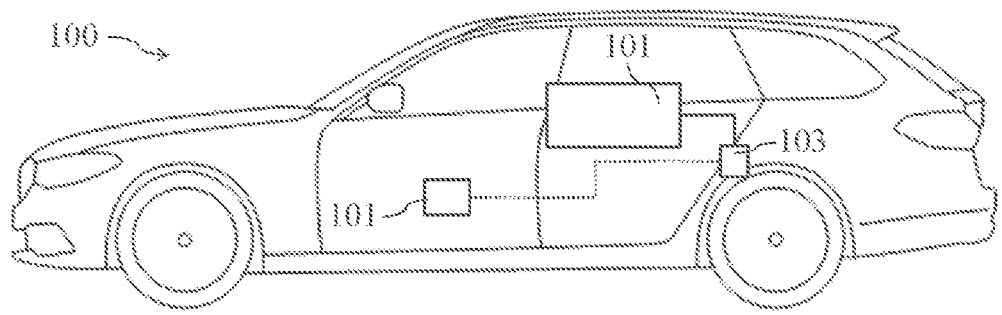
FIG. 1a shows illustrative components of a vehicle having an electrical drive machine.

As explained at the outset, the present document is concerned with carrying out safe, gentle and reliable starting of the vehicle electrical wiring system of a vehicle. In this context, FIG. 1a shows an illustrative vehicle 100 having at least one electrical energy store 101 for storing electrical energy for operating an electrical drive machine 103 of the vehicle 100. The energy store 101 may have a rated voltage of 300 V or more, in particular 800 V or more. A (control) device 101 of the vehicle 100 may be configured to control the operation of the electrical drive machine 103 on the basis of electrical energy from the energy store 101.

Figure 1B:
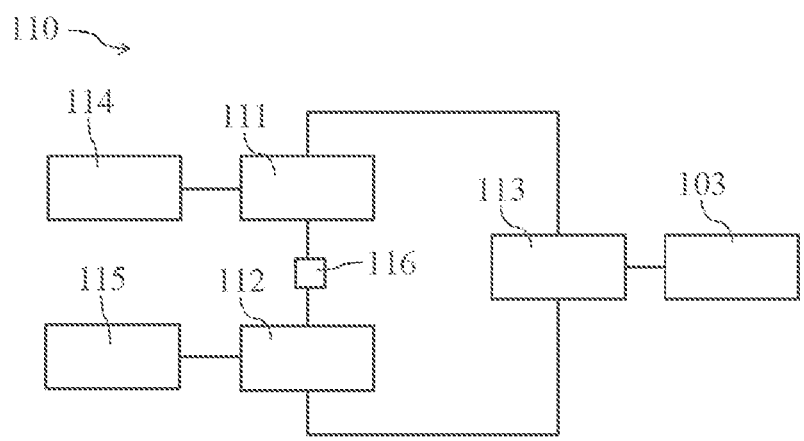
FIG. 1b shows an illustrative vehicle electrical wiring system of a vehicle.

FIG. 1b shows an illustrative vehicle electrical wiring system 110 for a vehicle 100. The vehicle wiring system 110 can comprise an inverter 113 that is configured to take the DC voltage provided by the energy store 101 as a basis for generating AC voltages for one or more phases of the electrical drive machine 103.

The energy store 101 of the vehicle 100 can comprise multiple partial stores 111, 112, which can be connected in series when required in order to increase the RMS rated voltage of the energy store 101 (and therefore the electrical power available to the drive machine 103). The vehicle wiring system 110 shown in FIG. 1b comprises a first (partial) store 111 and a second (partial) store 112, which may e.g. each have a partial rated voltage, meaning that series connection of the two stores 111, 112 results in an RMS rated voltage that is twice as high as the partial rated voltages of the individual energy stores 111, 112.

Series connection of the two energy stores 111, 112 can be caused or prevented by a series switching element 116 (e.g. by a semiconductor-based switching element or by a (mechanical) relay). This allows the RMS rated voltage resulting from series connection of the energy stores 111, 112 to be applied to the inverter 113, and to be available for operating the drive machine 103.

The vehicle wiring system 110 shown in FIG. 1b furthermore comprises a first DC-DC voltage converter 114 that can be coupled, or is coupled, to the first energy store 111 and that is configured to provide electrical energy from the first energy store 111 in a further vehicle wiring system of the vehicle 100 (e.g. in a low-voltage, for example 12V or 48V, vehicle wiring system). Furthermore, the vehicle wiring system 110 may have a corresponding second DC-DC voltage converter 115 that is coupled, or can be coupled, to the second energy store 112 and that is configured to provide electrical energy from the second energy store 112 in a, or in the same, further vehicle wiring system of the vehicle 100.

Figure 2:
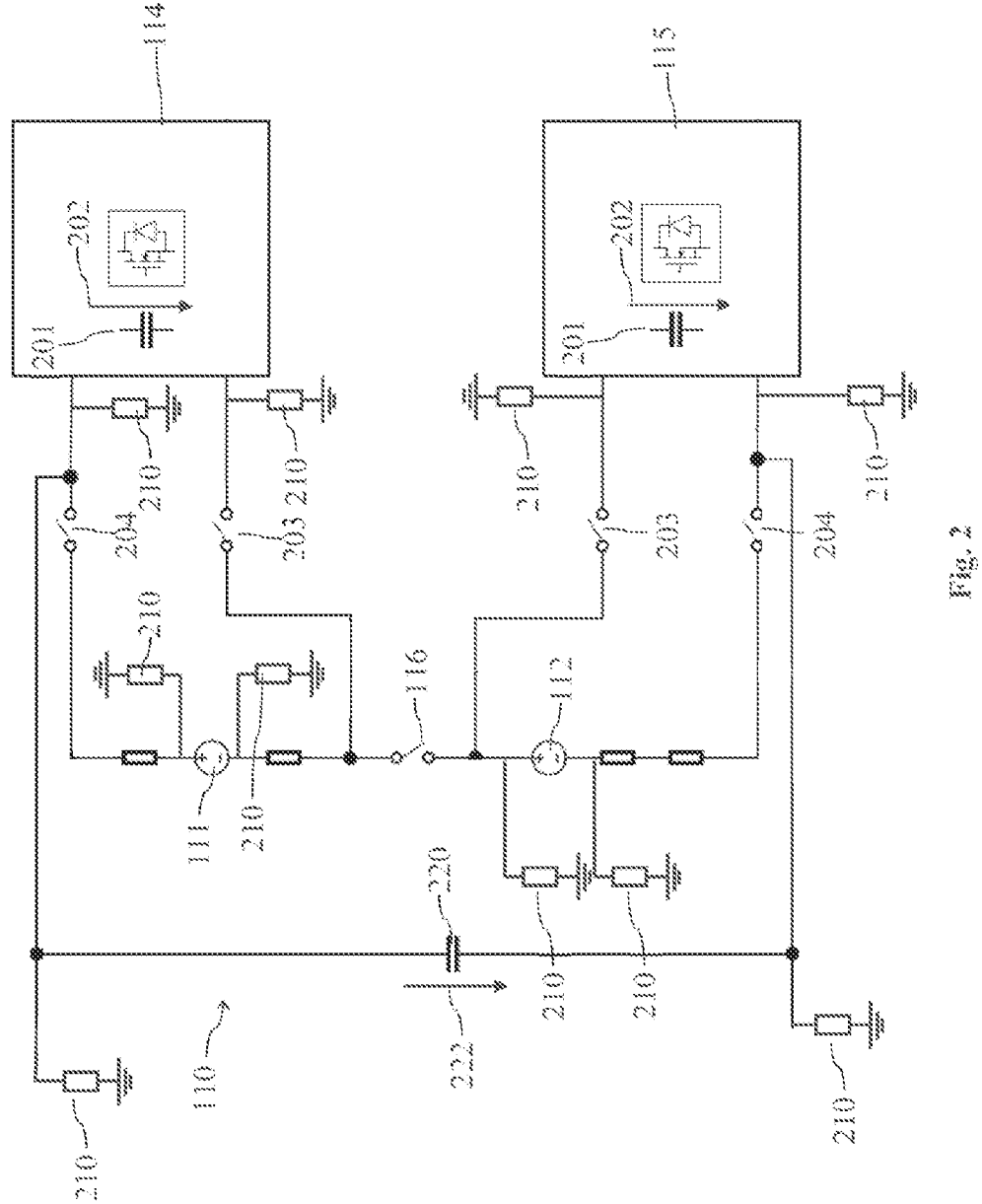
FIG. 2 shows an illustrative vehicle electrical wiring system having a series switching element.

FIG. 2 shows further details of the vehicle electrical wiring system 110 of a vehicle 100. The DC-DC voltage converters 114, 115 can each be coupled or decoupled to or from the respective energy store 111, 112 via converter switching elements 203, 204 (e.g. semiconductor-based switching elements or (mechanical) relays). Each DC-DC voltage converter 114, 115 is provided with a respective first converter switching element 203 that faces the series switching element 116 and is designed to couple or decouple a first pole of the DC-DC voltage converter 114, 115 to or from a coupling point between the first pole of the respective energy store 111, 112 and the series switching element 116. In addition, each DC-DC voltage converter 114, 115 is provided with a respective second converter switching element 204 that is designed to couple or decouple the second pole, which is remote from the series switching element 116, of the respective energy store 111, 112 to or from a second pole of the DC-DC voltage converter 114, 115.

The DC-DC voltage converters 114, 115 each have an input capacitance 201, in particular an input capacitor. The input capacitance 201 of a DC-DC voltage converter 114, 115 can be arranged in parallel with the respective energy store 111, 112 as a result of the first and the second converter switching element 203, 204 of the respective DC-DC voltage converter 114, 115 closing, meaning that the input voltage 202 across the input capacitance 201 of the respective DC-DC voltage converter 114, 115 substantially corresponds to the voltage of the respective energy store 111, 112.

The vehicle wiring system 110 furthermore comprises a DC link capacitance 220, e.g. at the input of the inverter 113. The DC link capacitance 220 may be arranged between the second poles of the two DC-DC voltage converters 114, 115. Furthermore, the DC link capacitance 220 may be arranged such that the DC link capacitance 220 is decoupled from the energy stores 111, 112 as a result of the second converter switching elements 204 opening. Closure of the second converter switching elements 204 and the series switching element 116 can cause the voltage 222 across the DC link capacitance 220 to correspond to the voltage of the series connection containing the energy stores 111, 112.

FIG. 2 shows various insulating resistors 210 of the vehicle electrical wiring system 110 (with respect to the bodywork or the ground of the vehicle 100). The resistance values of the different insulating resistors 210 of the vehicle electrical wiring system 110 can change in different ways over the life of a vehicle 100.

Before the vehicle electrical wiring system 110 is started (which occurs e.g. within the context of the vehicle 100 being started), the series switching element 116 and the converter switching elements 203, 204 may each be open. As a result, the DC link capacitance 220 has substantially no voltage. In particular, this can cause the (high) voltages of the energy stores 111, 112 not to be applied to the DC link capacitance 220 and/or not to be applied to the input capacitance 201 of the individual DC-DC voltage converters 114, 115. The vehicle electrical wiring system 110 may therefore be in a (touch-) safe state. This state of the vehicle wiring system 110 can be referred to as the basic state.

During a starting process of the vehicle electrical wiring system 110, the individual switching elements 116, 203, 204 can be gradually closed in order to couple the different components 114, 115, 220, 201, 113 of the vehicle wiring system 110 to the high voltage of the energy stores 111, 112.

First, a first step of the starting process can be used to close the first converter switching elements 203. A second step can then be used to close the series switching element 116. A third step can be used to close the second converter switching elements 204 in order to arrange the series connection comprising the energy stores 111, 112 in parallel with the DC link capacitance 220 and the inverter 113.

The vehicle electrical wiring system 110 typically has various measuring resistors (not shown) arranged in it that can lead to electrical energy being able to pass from one or more energy stores 111, 112 to the input capacitance 201 of one or more DC-DC voltage converters 114, 115, even in the basic state, and being able to produce an input voltage 202 across the respective DC-DC voltage converter 114, 115 as a result. The different aging of the insulating resistors 210 over the life of the vehicle wiring system 110 can furthermore lead to the input voltage 202 of at least one DC-DC voltage converter 114, 115 having a relatively high value, e.g. 200 V or more, even in the basic state. Such a situation can lead to there being a relatively high voltage across the series switching element 116 after the first and before the second step of the starting process of the vehicle wiring system 110, which voltage can lead to a relatively high compensating current when the series switching element 116 closes. This compensating current can in some cases cause damage to the series switching element 116 and/or to another component of the vehicle wiring system 110.

The (control) device 101 of the vehicle 100 and/or of the vehicle wiring system 110 may be configured to check the input voltages 202 of the one or more DC-DC voltage converters 114, 115 before the series switching element 116 closes. The input voltages 202 of the one or more DC-DC voltage converters 114, 115 can be taken as a basis for determining whether or not the input capacitance 201 of at least one DC-DC voltage converter 114, 115 needs to be discharged before the series switching element 116 closes.

If it is determined that at least one input capacitance 201 needs to be discharged, it is possible to cause the input capacitance 201 to be discharged by the DC-DC voltage converter 114, 115 (in particular as a result of the DC-DC voltage converter 114, 115 operating) in which the input capacitance 201 is arranged. By way of example, the energy stored in the input capacitance 201 can be transmitted to the further vehicle wiring system and, in some cases, stored in an energy store of the further vehicle wiring system. Alternatively, or additionally, the input capacitance 201 can be discharged to ground by the DC-DC voltage converter 114, 115.

As already explained earlier on, voltage measurements that are not completely DC isolated (i.e. measuring resistors) in a series HV system 110 having two or more stages in an electric vehicle 100 can result in voltages appearing across the capacitances 201 in the system 110 (while the system 110 is in the basic state). These capacitances 201 have their charges reversed when the series switching element 116 (e.g. a relay) switches, which can lead to relatively high switching currents in the short term. If aging effects arise in the vehicle 100 that lead to asymmetric aging of the insulating resistors 210 within the vehicle 100, the voltages 202 across the capacitances 201 in the system 110 can rise. This can result in the switching current being increased, which can lead to an impairment and/or a reduced life of one or more components 116 of the system 110.

The voltage 202 across the one or more capacitances 201 and/or across the series switching element 116 can be measured and detected before the switching process. Before the closing process of the series switching element 116, these one or more voltages 202 can be discharged by an active discharge of the one or more DC-DC converters 114, 115, in order to align them with the voltage 222 of the DC link capacitance 220, which is generally 0 V. This reduces the inrush currents when the series switching element 116 closes, and therefore increases the life of the components 116 of the system 110.

Figure 3:
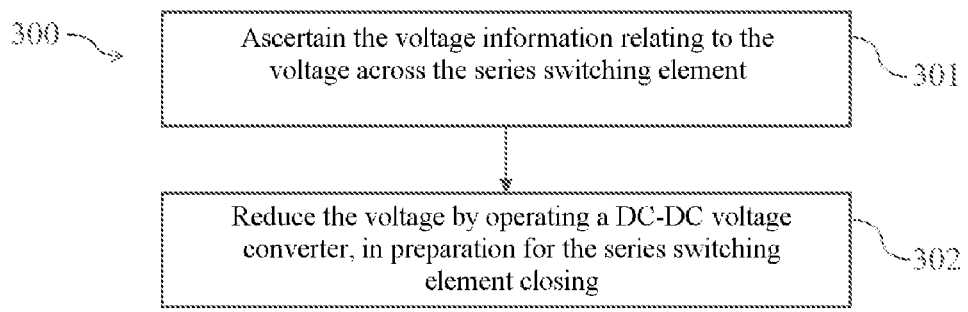
FIG. 3 shows a flowchart for an illustrative method for starting a vehicle electrical wiring system of a vehicle.

FIG. 3 shows a flowchart for an illustrative (in some cases computer-implemented) method 300 for controlling a starting process of a vehicle electrical wiring system 110 of a (motor) vehicle 100. The vehicle electrical wiring system 110 comprises a first energy store 111 and a second energy store 112 that are able to be connected in series as a result of a series switching element 116 closing. During the starting process, the series connection containing the first and the second energy store 111, 112 can be arranged in parallel with an inverter 113 of the vehicle wiring system 110 in order to supply the inverter 113 with electrical energy.

The vehicle wiring system 110 furthermore comprises a first DC-DC voltage converter 114, having a first pole that is coupled to a coupling point between a first pole of the first energy store 111 and the series switching element 116 (in some cases via a first converter switching element 203), and having a second pole that is coupled to a second pole of the first energy store 111 via a second converter switching element 204 (if the second converter switching element 204 is closed). The first DC-DC voltage converter 114 can be arranged in parallel with the first energy store 111 as a result of the first and the second converter switching elements 203, 204 closing. Furthermore, the first DC-DC voltage converter 114 may be designed to transfer electrical energy from the first energy store 111 to a further vehicle wiring system (of the vehicle 100).

The vehicle wiring system 110 may furthermore have a second DC-DC voltage converter 115, which may be arranged in parallel with the second energy store 112 via in each case a first and a second converter switching element 203, 204 in corresponding fashion.

The method 300 comprises ascertaining 301, before the series switching element 116 closes, voltage information relating to the voltage across the series switching element 116. The voltage information can be ascertained e.g. on the basis of a measured value of the input voltage 202 at the input of the first DC-DC voltage converter 114.

In addition, the method 300 comprises taking the voltage information as a basis for reducing 302 the voltage across the series switching element 116 before the series switching element 116 closes as a result of the first DC-DC voltage converter 114 operating. The first DC-DC voltage converter 114 can be operated in order to transport electrical charge away from the input of the first DC-DC voltage converter 114, and in order thereby to reduce the voltage across the series switching element 116. The reducing 302 of the voltage across the series switching element 116 can be caused if the voltage information indicates that the voltage across the series switching element 116 is greater than a predefined voltage threshold value. The first DC-DC voltage converter 114 can be operated until the voltage across the series switching element 116 is equal to or less than the voltage threshold value. The series switching element 116 can then be closed in order to continue the starting process of the vehicle wiring system 110.

The measure described in this document can be used to achieve a safe, gentle and reliable starting process for a vehicle electrical wiring system 110 of a vehicle 100.

The present invention is not limited to the exemplary embodiments shown. In particular, it should be noted that the description and the figures are intended to illustrate the principle of the proposed methods, devices and systems only by way of example.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for controlling a starting process of a vehicle electrical wiring system of a vehicle,
   wherein the vehicle electrical wiring system comprises a first energy store and a second energy store that are able to be connected in series as a result of a series switching element closing,
   wherein the vehicle wiring system comprises a first DC-DC voltage converter, having a first pole that is coupled to a coupling point between a first pole of the first energy store and the series switching element, and having a second pole that is coupled to a second pole of the first energy store via a second converter switching element,
   wherein the device is configured to:
      ascertain, before the series switching element closes, voltage information relating to a voltage across the series switching element; and
      take the voltage information as a basis for operating the first DC-DC voltage converter in order to cause the voltage across the series switching element to be reduced before the series switching element closes.

2. The device according to claim 1, wherein the device is configured to, during the starting process:
   determine that the voltage across the series switching element is equal to or less than a voltage threshold value; and
   respond to this by causing the series switching element to be closed.

3. The device according to claim 1,
   wherein the first DC-DC voltage converter has an input capacitance, and
   wherein the device is configured to:
      ascertain a measured value for an input voltage across the input capacitance of the first DC-DC voltage converter; and
      ascertain the voltage information relating to the voltage across the series switching element on the basis of the measured value of the input voltage across the input capacitance of the first DC-DC voltage converter.

4. The device according to claim 1, wherein the device is configured to operate the first DC-DC voltage converter in order to:
   transfer electrical energy from an input, in particular from an input capacitance, of the first DC-DC voltage converter to a further vehicle wiring system of the vehicle; and/or
   dissipate electrical energy from an input, in particular from an input capacitance, of the first DC-DC voltage converter to a ground of the vehicle.

5. The device according to claim 1,
   wherein the vehicle wiring system has a first converter switching element between the first pole of the first DC-DC voltage converter and the coupling point; and
   wherein the device (101) is configured to:
      use a first step of the starting process to cause the first converter switching element to be closed in order to couple the first pole of the first DC-DC voltage converter to the coupling point; and
      ascertain the voltage information relating to the voltage across the series switching element after the first converter switching element has closed and before the series switching element closes.

6. The device according to claim 1, the device being configured to, during the starting process, subsequently to the series switching element closing, cause the second converter switching element to be closed in order to couple the second pole of the first DC-DC voltage converter to the second pole of the first energy store.

7. The device according to claim 1,
   wherein the vehicle wiring system comprises a second DC-DC voltage converter, having a first pole that is coupled to a further coupling point between a first pole of the second energy store and the series switching element, and having a second pole that is coupled to a second pole of the second energy store via a further second converter switching element; and
   the device is configured to take the voltage information as a basis for operating the second DC-DC voltage converter in order to cause the voltage across the series switching element to be reduced before the series switching element closes.

8. A vehicle electrical wiring system for a vehicle, comprising:
   a first energy store and a second energy store;

a series switching element configured to connect the first energy store and the second energy store in series as a result of the series switching element closing;
a first DC-DC voltage converter having a first pole that is coupled to a coupling point between a first pole of the first energy store and the series switching element;
a second converter switching element configured to couple or decouple a second pole of the first DC-DC voltage converter to or from a second pole of the first energy store; and
a device according to claim 1, for controlling a starting process of the vehicle wiring system.

9. The vehicle wiring system according to claim 8, wherein the vehicle wiring system further comprises:
a first converter switching element configured to couple or decouple the first pole of the first DC-DC voltage converter to or from the coupling point;
a second DC-DC voltage converter, having a first pole that is coupled to a further coupling point between a first pole of the second energy store and the series switching element;
a further first converter switching element configured to couple or decouple the first pole of the second DC-DC voltage converter to or from the further coupling point;
a further second converter switching element configured to couple or decouple a second pole of the second DC-DC voltage converter to or from a second pole of the second energy store; and
a DC link capacitance, which is arranged between the second pole of the first DC-DC voltage converter and the second pole of the second DC-DC voltage converter, and which can be decoupled from the second pole of the first energy store and from the second pole of the second energy store as a result of the second converter switching elements opening and can be arranged between the second pole of the first energy store and the second pole of the second energy store as a result of the second converter switching elements closing.

10. The vehicle wiring system according to claim 8, wherein the device is configured to, during the starting process of the vehicle wiring system:
use a first step to close the first converter switching elements in order to couple the first pole of the first DC-DC voltage converter to the coupling point and the first pole of the second DC-DC voltage converter to the further coupling point;
ascertain the voltage information relating to the voltage across the series switching element after the first converter switching elements have closed and before the series switching element closes;
if the voltage across the series switching element is equal to or less than a voltage threshold value, use a second step to close the series switching element in order to produce a series connection containing the first energy store and the second energy store; and
use a third step to close the second converter switching elements in order to arrange the series connection containing the first energy store and the second energy store in parallel with the DC link capacitance.

11. A method for controlling a starting process of a vehicle electrical wiring system of a vehicle,
wherein the vehicle electrical wiring system comprises a first energy store and a second energy store that are able to be connected in series as a result of a series switching element closing,
wherein the vehicle wiring system comprises a first DC-DC voltage converter, having a first pole that is coupled to a coupling point between a first pole of the first energy store and the series switching element, and having a second pole that is coupled to a second pole of the first energy store via a second converter switching element,
the method comprising:
ascertaining, before the series switching element closes, voltage information relating to a voltage across the series switching element; and
taking the voltage information as a basis for reducing, as a result of the first DC-DC voltage converter operating, the voltage across the series switching element before the series switching element closes.

* * * * *